Patented July 22, 1924.

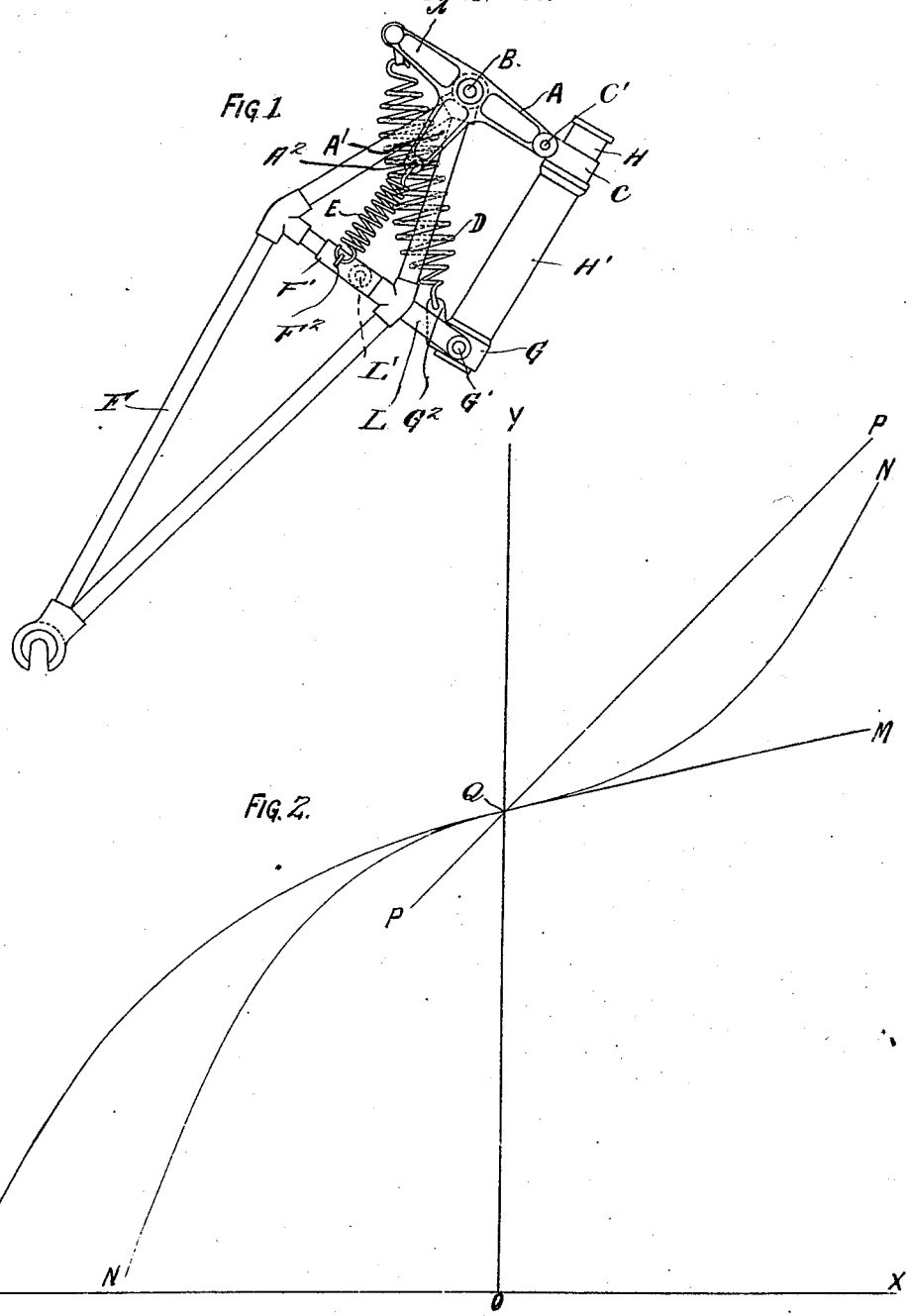

1,502,151

UNITED STATES PATENT OFFICE.

FREDERICK WILLIAM MEREDITH, OF SOUTH FARNBOROUGH, ENGLAND.

MOTOR-CYCLE SPRING FORK.

Application filed August 21, 1923. Serial No. 658,525.

*To all whom it may concern:*

Be it known that I, FREDERICK WILLIAM MEREDITH, a subject of the King of the United Kingdom of Great Britain and Ireland, of 9 Church Circle, South Farnborough, Hampshire, England, having invented certain new and useful Improvements in Motor-Cycle Spring Forks, do hereby declare that the following is a full, clear, and exact description of the same.

This invention relates to improvements in spring mechanism and has for its object to provide an improved arrangement suitable for use in the suspension systems of motor cycles, the arrangement being such that a limited displacement produces only a small restoring force while for larger displacements the rate of change of force with displacement can be arranged to increase as desired.

A spring system in accordance with the invention includes a main spring acting through a suspension arm or lever and taking the whole normal load in such manner that when the strain increases the effective leverage of the spring decreases so that a long periodic time of free oscillation of the load on the suspension arm may be obtained. In conjunction with such main spring there is provided a restoring spring acting to increase the stiffness of the whole suspension for relatively large displacements. The main spring is arranged to act on the suspension arm at an angle to such arm when the system is in its central position under load so as to place the said arm in compression.

The invention is illustrated in the accompanying drawings in which Fig. 1 is a side elevation of one form of the suspension as applied to the front fork of a motor cycle. Fig. 2 is a graph showing the loading curves given by a main spring, the curve as varied by the restoring spring and the adjustment line hereinafter explained.

In Fig. 1 of the drawing the invention is shown as applied to a motor cycle frame and fork mechanism similar to that shown in the patent granted to Ridgway, No. 1,042,480, and while this drawing, being a side elevation of the application of the invention, shows only one of each of the respective parts, it is to be understood that these parts are duplicated on the other side of the cycle as is common in such vehicles and as shown in the patent referred to.

Referring now to the drawing in detail, H represents the steering head or column which, as usual, passes up through and is rotatable within the inclined front member H' of the frame of the motor cycle. Fixed to the steering head near the upper end thereof is a collar C to which is pivotally connected, on the opposite sides thereof as at C', a pair of links A which project forward from the steering head and are pivotally connected as at B to the front forks F which are adapted to carry the front wheel of the cycle. These forks comprise a pair of upright members connected at their upper and lower ends, and splayed intermediate these ends, where they are also connected by the member F'.

To the lower end of the steering head there is attached a collar G to which is pivotally connected, on the opposite side thereof as at G', a pair of links L. The other ends of these links are pivotally connected to the member F' of the forks at L'. The connection of the forks to the steering head by the pivoted links A and L provides means whereby the forks may move with relation to the frame during operation of the cycle, and prevents the road shocks being transmitted to the occupant of the cycle. To hold the forks of the cycle in their normal position and to absorb the shocks when travelling over uneven surfaces, there is provided a main spring D which is connected at one end to a lug $G^2$ of the collar G, and at its other end to an extension X of the link A. The link A is provided with a second extension A' extending therefrom at substantially right angles and at a point opposite the pivot B. This extension A' is connected to the forks by a restoring spring E which is connected to the forks at the point $F^2$ and to the extension A' at the point $A^2$. When the parts are in their normal position, as shown in Fig. 1 of the drawing, the pivotal point B, the extension A' and the restoring spring E are all in alinement, and the effective leverage of the spring at its point of connection with the extension A' is zero. If while the parts are in this position, the front wheel encounters an irregularity in the road, the forks will be permitted to move upwardly with respect to the frame, due to the pivoted links A and L. As the forks move upwardly with respect to the frame, the link A moves about its pivotal points, causing the distance between the points of connection of the main spring D with the extension X and the collar G to be increased, and the spring extended and caused to change its position with respect to the other parts of the mechanism. As the end of the spring D, which is attached to the lug G², cannot move, it will be readily seen that the greater the upward movement of the point of connection of the main spring D with the extension X, the nearer will the axis of this spring be shifted towards the pivotal point B of the link A, and that the nearer the axis of this spring approaches this point the greater is the decrease of its effective leverage at its point of connection with the link A. As the link A swings about the pivot B, the extension A' also changes its position and moves from out of alinement with the points B and F², thereby causing the distance between the points of connection of the spring with the extension A' and the member F² to increase and the spring E to extend. The swinging of the extension A' away from its normal position causes the effective leverage of the restoring spring E, at its point of connection with the extension A', to move from its zero point and to increase as the effective leverage of the main spring decreases. It will thus be seen that by arranging the respective parts as shown, there is provided means whereby the decrease of the effective leverage of the main spring is counteracted by the provision of a restoring spring which is so arranged that its effective leverage is increased as the effective leverage of the main spring is decreased, and that the combined effective leverages on the link A remain substantially constant.

In Fig. 2 the displacements of the wheel relative to the body of the vehicle, are set off or measured in a horizontal direction from the line O Y which line represents the normal position of the wheel, relative to the vehicle. The reacting forces between the spring system and the wheel corresponding to every displacement of the latter are measured in a vertical direction from the line O X. The curve M represents the load-curve given by the main spring and the curve N the resultant load-curve of the combination of the main spring and the restoring spring. The point Q represents on the curve N the undisturbed position of the wheel.

I claim:

1. A spring fork mechanism for a vehicle comprising, a steering post, a fork member, a lever member pivotally connected at one end to the post and pivotally connected at an intermediate point to the fork member, a main spring connecting the other end of the lever member and the post, so arranged that the effective leverage at the point of connection of the spring to the lever member decreases as the tension of the spring increases, said lever member including an arm, a restoring spring connecting the arm and the fork member, said restoring spring being normally inoperative but operative when the main spring is under tension, the effective leverage at the point of connection of the restoring spring to the arm increasing as the first mentioned effective leverage decreases.

2. A spring fork mechanism for vehicles comprising, a steering post, a fork member, a lever member connecting the fork member to the post, a main spring connecting the lever member and the post and so arranged that the effective leverage at the point of connection on the lever member decreases as the tension of the spring increases, a restoring spring connecting the lever member and fork member, said restoring spring being normally inoperative but operative when the main spring is under tension, the effective leverage at the point of connection of the restoring spring to the lever member increasing as the first mentioned effective leverage decreases.

In testimony whereof I have signed my name to this specification.

FREDERICK WILLIAM MEREDITH.